May 10, 1932.  H. GÜTTINGER  1,857,449
ELECTRIC REGULATOR
Filed May 22, 1930

Inventor
Heinrich Güttinger
By Alfred H. Dyson
Attorney.

Patented May 10, 1932

1,857,449

UNITED STATES PATENT OFFICE

HEINRICH GÜTTINGER, OF WETTINGEN, SWITZERLAND, ASSIGNOR TO AKTIENGESELL-SCHAFT BROWN BOVERI & CIE., OF BADEN, SWITZERLAND, A JOINT-STOCK COMPANY OF SWITZERLAND

ELECTRIC REGULATOR

Application filed May 22, 1930, Serial No. 454,573, and in Germany May 31, 1929.

This invention relates to improvements in electric regulators of the character disclosed in my United States Letters Patent No. 1,003,600 dated September 19, 1911, and, particularly, to an improved method of securing the resilient support and attachment of the recall portions of the driving system thereof.

The electric regulator above referred to may conveniently be divided into two systems, namely a resistance or regulating system which is connected with the electrical machine to be regulated and a motive or driving system for varying the amount of the resistance system in a circuit to be controlled. Such regulators are arranged to over- or under-regulate to obtain a quick aperiodic action and the motive system therefore, requires an elastic return or recall device for damping oscillations and for returning the motive system to the equilibrium position thereof. Such recall device must, of course, be elastically connected with the spindle of the driving system and mounted thereon to secure operation with a minimum of resistance or friction.

It is, therefore, among the objects of the present invention to improve the connection or coupling of an elastic recall device with the spindle of the driving system of an electric regulator.

Another object of the invention is to provide a knife-edged bearing for supporting the recall device on the driving spindle of an electric regulator.

Another object of the invention is to provide an elastic coupling or connection between the recall device and the driving spindle of an electric regulator on which the recall device is supported by a knife-edged bearing plate.

Figure 1:
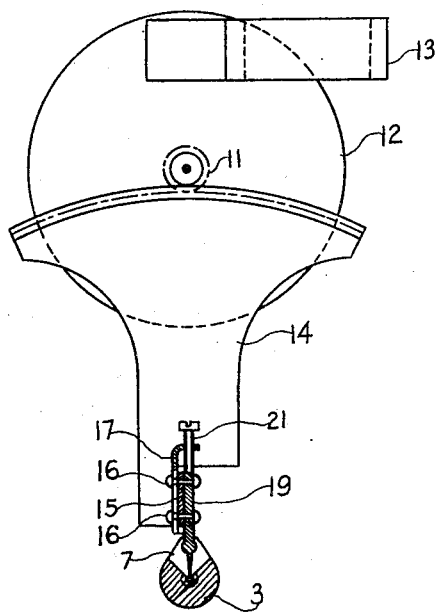
Figure 2:
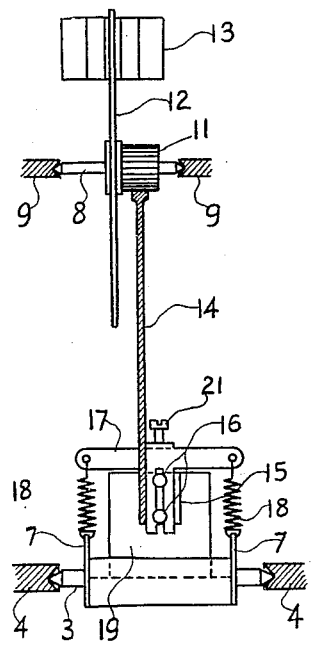

Objects and advantages, other than those above set forth, will be apparent from the following description when read in connection with the accompanying drawings; in which Figure 1 is a front view showing a portion of the spindle of the driving system of a regulator and the manner of mounting the recall device thereon, and Fig. 2 is a side view of the structure illustrated in Fig. 1.

Referring more particularly to the drawings by characters of reference, the reference numeral 3 designates the spindle of the driving system of a regulator which is supported in suitable, preferably jewelled, supports or bearings 4. The spindle 3 is formed with an enlarged portion having a substantially triangular groove cut thereinto and is provided at the ends of the groove with sheet metal ears 7 which extend eccentrically relative to the center line of the spindle by a certain amount.

A recall and damping device which includes a spindle 8, rotatably supported in, preferably jewelled, bearings 9, which carries a gear 11 and a disk 12 rotating between the poles of a magnet 13; is connected with the spindle 3 by a sector gear 14 engaging the gear 11 and an elastic coupling to be now particularly described.

A portion 15 of the inner end of the sector gear 14 is bent at right angles to the plane of the gear and is provided with a plurality of holes having bolts 16 passing therethrough. A bow 17 having two arms extending parallel to the spindle 3 is held under the bolts 16 in sliding adjustable contact with the portion 15 of the sector gear and the arms of the bow are connected with the ears 7 by means of springs 18. A metal plate 19 having a hardened knife-edge is mounted in sliding adjustable relation with the gear portion 15 under the bolts 16.

The springs 18 are maintained under the proper tension, thereby securing the proper engagement of the knife-edge of plate 19 in the groove of the spindle 3, by means of an adjustable set screw 21 passing through the bow 17 into contact with the plate 19. It will be seen that the present coupling provides an elastic connection between the driving system spindle and the recall device which coupling is arranged in such manner that any required degree of tension may be obtained and maintained thereon.

Although but one embodiment of the present invention has been illustrated and described, it will be apparent to those skilled in the art that various changes and modifications may be made therein without departing from the spirit of the invention or from the scope of the appended claims.

The invention claimed is:

1. In an electric regulator, a driving spindle having a groove formed therein, a magnetically damped recall device for returning said spindle to the equilibrium position, a plate adjustably mounted on said recall device and engaging in the groove in said spindle, means for adjusting said plate relative to said recall device, and springs connecting said adjusting means and said spindle.

2. In an electric regulator, a driving spindle having a groove formed therein, a magnetically damped recall device, a knife-edged plate adjustably mounted on said recall device and supported in the groove of said spindle, and adjustable means elastically connecting said spindle and said recall device.

3. In an electric regulator, a driving spindle having a groove formed therein, a magnetically damped recall device, a knife-edged plate adjustably mounted on said recall device and supported on the knife-edge thereof in the groove of said spindle, and springs connecting said spindle and said recall device.

4. In an electric regulator, a driving spindle having a groove formed therein, a magnetically damped rotating device, a sector gear engaging said damped device, a portion of said sector gear being bent at right angles to the gear teeth thereof, a knife-edged plate adjustably mounted on the bent portion of said sector gear and engaging in the groove in said spindle, a bow adjustably mounted on the bent portion of said sector gear, springs connecting said bow and said spindle, and adjusting means connecting said plate and said bow to maintain said springs under tension.

5. In an electric regulator, a driving spindle having a groove formed therein, a magnetically damped rotary device, a sector gear engaging said damped device and rotatable thereby, a portion of said sector gear being bent at right angles to the plane of the gear, a knife-edged plate adjustably mounted on the bent portion of said sector gear and engaging in the groove in said spindle on the knife-edge thereof, a bow adjustably mounted on the bent portion of said sector gear, ears secured on and extending eccentrically of said spindle adjacent the groove therein, springs connecting said bow and said spindle, and adjusting means connecting said plate and said bow to maintain said springs under the required tension.

6. In an electric regulator, a driving member having a bearing surface, a damped recoil device, an adjustable bearing element mounted on said recoil device and supported on the said bearing surface, and adjustable means elastically connecting said driving member and said recoil device.

In testimony whereof I have hereunto subscribed my name this 8th day of May, A. D. 1930.

HEINRICH GÜTTINGER.